United States Patent [19]
Udaka et al.

[11] Patent Number: 6,045,725
[45] Date of Patent: Apr. 4, 2000

[54] OPTICAL DEVICE AND ELECTROLYTIC SOLUTION

[75] Inventors: Toru Udaka, Kanagawa; Hideharu Miyagaki, Chiba, both of Japan

[73] Assignee: Sony Corporation, Tokyo, Japan

[21] Appl. No.: 08/924,599

[22] Filed: Sep. 4, 1997

[30] Foreign Application Priority Data

| Sep. 6, 1996 | [JP] | Japan | ............................... P08-257866 |
| Aug. 7, 1997 | [JP] | Japan | ............................... P09-207980 |

[51] Int. Cl.⁷ ............................. G02B 5/23; G02F 1/153
[52] U.S. Cl. ..................... 252/586; 252/582; 359/273; 359/275
[58] Field of Search ....................... 252/586, 582; 359/273, 275

[56] References Cited

U.S. PATENT DOCUMENTS

| 5,210,638 | 5/1993 | Eid et al. .................... 359/265 |
| 5,215,684 | 6/1993 | Okabayashi et al. ............ 252/582 |
| 5,274,493 | 12/1993 | Couput et al. ................ 359/275 |
| 5,279,932 | 1/1994 | Miyasaka et al. .............. 430/495 |
| 5,327,281 | 7/1994 | Cogan et al. ................. 359/270 |
| 5,332,530 | 7/1994 | Eid et al. .................... 252/583 |
| 5,695,690 | 12/1997 | Swirbel et al. ............... 252/582 |
| 5,729,379 | 3/1998 | Allemand et al. .............. 359/270 |

*Primary Examiner*—C. H. Kelly
*Attorney, Agent, or Firm*—Hill & Simpson

[57] ABSTRACT

An optical device is provided as an optical filter including a pair of substrates at least one of which is transparent, at least one transparent electrode disposed on one side of the transparent substrate, at least one counter electrode, a spacer provided between a pair of the substrates at peripheries thereof, and an RED solution as a filtering material provided in a space between a pair of the substrates. The RED solution includes a silver salt and a mixed solvent, preferably DMSO and another solvent, for dissolving the silver salt. The transparent electrodes and the counter electrode are driven by applying a voltage thereto, and the silver salt is reversibly deposited and dissolved by controlling the voltage. The RED solution is brought to be colored and to be colorless, respectively, so that an amount of light passing through the device may be adjusted.

27 Claims, 7 Drawing Sheets

OPTICAL DEVICE AND ELECTROLYTIC SOLUTION

BACKGROUND OF THE INVENTION

The present invention relates to an optical device such as a display device for a numerical or character display, or an X-Y matrix display, and an optical filter capable of controlling transmissivity or reflectance of light, and to an electrolytic solution used for such an optical device.

In voltage-driven display devices such as digital clocks for displaying time, there have been adopted electrochromic materials (hereinafter referred to as EC materials).

A display device using the electrochromic material, an electrochromic display element (hereinafter referred to as ECD), is a non-light-emitting display device which performs a display with a reflected or transmitted light as an electrochemical light adjusting element. Thus, they have advantages not to make observers fatigue even for a long time observation, to be driven at a relatively low voltage, and to consume less power. For example, as disclosed in Unexamined Published Japanese Patent Application No. 59-24879, a liquid type ECD is well known in which a viologen molecular derivative of organic molecular family reversibly forming colored or colorless state is used as an EC material.

However, when an EC material such as a viologen molecular derivative or the like was used in an ECD element, its response and light shielding were so insufficient as those required in an actual device that it has never been put in practical use so far. Furthermore, in spite of the requirement that the device must be able to control the light transmissivity in the visible light region (400 to 700 nm in wavelength) as a light quantity adjusting device, none of EC materials having been used so far have not well satisfied such requirement.

Under such circumstances, the inventors have noticed to apply deposition or dissolution of metallic salt to a light adjusting element as a substitute for ECD, and have carried out development of an electrochemical light adjusting element to which deposition or dissolution of silver is applied. As a result, the inventors have obtained an element with aimed characteristics in both the response and the light shielding.

In spite of this, there was still found a problem that an element using a solvent such as dimethylsulfoxide (DMSO) with high solidifying point (18° C. in DMSO) was, despite the high reversibility of silver deposition and dissolution, so poor in low temperature characteristics as to be easily solidified at low temperature.

An object of this invention is therefore to provide an optical device that can be driven with a low power consumption, can control the transmissivity or reflectance of light in the visible region, and furthermore, has satisfactory low temperature characteristics, as well as an electrolytic solution used for the optical device.

SUMMARY OF THE INVENTION

In order to achieve the above object, the present invention provides an optical device comprising:
 a pair of substrates, at least one of said substrates being transparent;
 at least one transparent electrode disposed on one side of the transparent substrate;
 at least one counter electrode;
 a spacer provided between a pair of said substrates at peripheries thereof; and
 an electrolytic solution provided in a space between a pair of the substrates, the electrolytic solution comprising a silver salt such as AgF, AgCl, AgBr, AgI and AgSCN (hereinafter referred to as a silver salt) and a mixed solvent comprising at least two kinds of solvents for dissolving the silver salt.

In the optical device, the transparent electrodes and the counter electrode are driven by applying a voltage thereto, and the silver salt is deposited and dissolved by controlling the voltage, thereby bringing the electrolytic solution to be colored and to be colorless, respectively.

According to the present invention, an electrolytic solution is also provided which comprises;
 a silver salt; and
 a mixed solvent comprising at least two kinds of solvents for dissolving the silver salt.

The electrolytic solution is provided between a pair of electrodes to which a voltage is applied, and the silver salt is deposited and dissolved by controlling the voltage, thereby bringing the electrolytic solution to be colored and to be colorless, respectively.

In the optical device and the electrolytic solution according to the present invention, a silver (complex) salt is used as a material for reversible plating that induces deposition or dissolution of silver, that is, a material for RED(Reversible Electro-Deposition), because the silver (complex) salt allows the solution thereof to absorb no light in the visible region (400 to 700 nm in wavelength) when the solution is prepared and to shield the light almost uniformly in the visible region when the solution is colored. Furthermore, the silver (complex) salt exhibits satisfactory reversibility between deposition and dissolution by controlling the driving voltage applied to the electrodes. Compared with this, cyanogen family solutions used for plating bathing have been well known for conventionally depositing silver from a silver (complex) salt. Use of such cyanogen family solutions, however, causes problems of necessitating to ensure safe working environment and waste solution disposal. Thus, a non-cyanogen silver salt is used in the present invention.

By thus using a reversible system for depositing or dissolving silver on the transparent electrodes from silver (complex) salt, that is, by using a material for RED (Reversible Electro-Deposition) as a material for reversible plating, there can be provided a less power consuming and non-light-emitting type optical device such as an optical filter suitable for the visible light region.

In addition, an important point of the optical device and electrolytic solution according to this invention is that the solvent used for preparing the silver salt solution comprises at least two kinds of solvents (mixed solvents). Therefore, by mixing dimethylsulfoxide (DMSO) and another solvent especially compatible with DMSO to make the mixed solvent, the low temperature property of the solution can be improved and the service temperature range can be expanded to cope with the problem that the working environment of the elements is limited due to its poor temperature property if a single solvent of dimethylsulfoxide (DMSO) is used as mentioned above.

Consequently, in the optical device and electrolytic solution according to the present invention, a mixed solvent is used by mixing a plurality of solvents that are high in reversibility for depositing or dissolving silver, but poor in temperature property, whereby a plurality of the solvents are made to respectively contribute to dissolution of the compositions of the electrolytic solution such as the silver salt and to prevention of solidification of the electrolytic solution at low temperature. This makes the electrolytic solution free from freezing in a device used in any cold districts.

DESCRIPTION OF THE PREFERRED EMBODIMENTS

Figure 1:
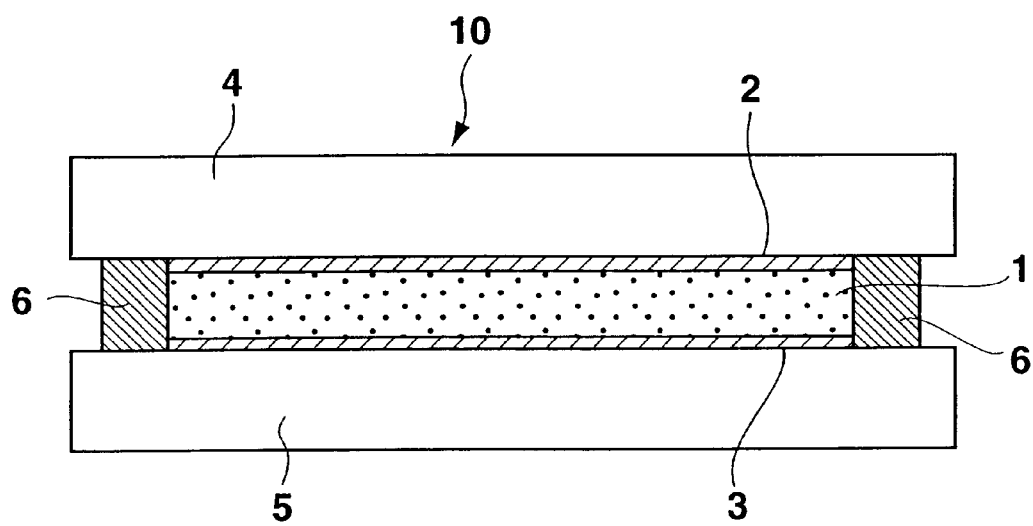
FIG. 1 is a schematic cross sectional view showing an embodiment of an optical filter according to the present invention.

The above mentioned mixed solvent in the optical device and electrolytic solution according to the present invention preferably comprises at least two kinds of solvents selected from the group consisting of propylene carbonate (PC), acetonitrile (AN), dimethylformamide (DMF), diethylformamide (DEF), N,N-dimethylacetamide (DMAC), N-methylpropionamide (MPA), N-methylpyrolidone (MP), 2-ethoxyethanol (EEOH), 2-methoxyethanol (MEOH), dimethylsulfoxide (DMSO), dioxolane (DOL), ethylacetate (EA), tetrahydrofuran (THF), methyltetrahydrofuran (MeTHF), dimethoxyethane (DME), and γ-butyrolactone (γ-BL). Especially, a mixed solvent is preferable which comprises dimethylsulfoxide and another solvent.

The following are chemical formulas of the above described solvents.

[Chemical formulas 1]

propylene carbonate (PC)   acetonitrile (CH$_3$CN) (AN)   N,N-dimethylformamide (DMF)

-continued

N,N-diethylformamide (DEF)   N,N-dimethylacetamide (DMAC)

N-methylpropionamide (MPA)   N-methylpyrolidone (MP)

2-ethoxyethanol (EEOH)   2-methoxyethanol (MEOH)

dimethylsulfoxide (DMSO)   1,3-dioxolane (DOL)   ethylacetate (EA)

tetrahydrofuran (THF)   2-methyltetrahydrofuran (2-MeTHF)

1,2-dimethoxyethane (DME)   1,2-diethoxyethane (DEE)

γ-butyrolactone (γ-BL)

The above described mixed solvent preferably comprises a plurality of kinds of solvents having structures different from each other. For example, it may comprise a solvent with a cyclic structure and a solvent with a non-cyclic structure(e.g. a chain structure). Or, even if both solvents have cyclic structures, a heterocyclic compound and a non-heterocyclic compound, a five-membered ring compound and six-membered ring compound, and a heterocyclic compound with one kind of hetero-atom and that with two kinds of hetero-atoms may be combined. Furthermore, even for a combination of ones with non-cyclic structure, a combination of one with a chain structure and one with a non-chain structure, and a combination of one with hetero-atom and one without hetero-atom can be possible.

Particularly, the mixed solvent is preferably a mixed solvent comprising dimethylsulfoxide and another solvent. In this mixed solvent, the fraction of dimethylsulfoxide is preferably equal to or larger than that of another solvent in making solubility and low temperature property of the silver salt compatible. For example, when the mixed solvent is kept at −20° C. for two hours, for silver salt to supporting electrolyte(described later) ratio of 2:3, the mixed solvent preferably comprises dimethylsulfoxide and acetonitrile, with mixing ratios (dimethylsulfoxide:acetonitrile)=(50:50) to (55:45) in volume ratio, or dimethylsulfoxide and a solvent with a cyclic structure with mixing ratios (dimethylsulfoxide:the solvent with a cyclic structure)= (55:45) to (60:40). Excessively small fraction of dimethylsulfoxide will be liable to cause salt deposition, and excessively large fraction will be liable to cause solidification at low temperature. However, as described later, the mixing ratio of the mixed solvent (dimethylsulfoxide(DMSO) :another solvent) may be varied in the range of (60:40) to (20:80) for some ratios of the silver salt and the supporting electrolyte.

Furthermore, as the above-mentioned silver salt, silver halide such as AgBr is preferably used and a solution with its concentration being 0.005 to 2.0 mol/L is preferably used.

In addition, for dissolving the silver halide, the silver halide is preferably made to form a complex salt by using a supporting salt that can provide halogen family element of the same kind or different kind (e.g. sodium halide, lithium halide, calcium halide, or quaternary ammonium salt).

In this case, the concentration of the supporting salt is preferably ½ to 5 times that of the silver salt.

Furthermore, transparent electrodes (especially ITO electrodes, obtained by doping indium oxide with tin) as working electrodes for depositing or dissolving silver acting as a filtering material can be chemically or physically modified to lower the potential for depositing silver onto the transparent electrodes to make deposition or dissolution of silver easy, and reduce electrical damages to the transparent electrodes and electrolyte itself.

The method of chemical modification in this case is preferably carried out as the surface treatment of the ITO electrodes with palladium by two-solution treatment using tin solution and palladium solution. That is, a surface activation treatment of the ITO electrodes is carried out by using palladium, in which the palladium nucleus is deposited on the single ITO substrate to enhance the activity on the surface of the ITO electrode.

In this case, a tin solution in which tin chloride ($SnCl_2$) of 0.10 to 1.0 g is dissolved in a litter of HCl (0.010 to 0.10%) and a palladium solution in which palladium chloride ($PdCl_2$) of 0.10 to 1.0 g is dissolved in a liter of HCl (0.010 to 0.10%) can be used.

Furthermore, as a physical modulation method, a method of depositing a metal nobler than silver on each of ITO electrodes with evaporation can be adopted.

When the above-mentioned silver halide is silver iodide whose reversibility is especially high, a supporting electrolyte (supporting salt) such as sodium iodide (NaI) is preferably added to the solution with concentrations ranging from equal to 20 times that of the silver iodide to increase the conductivity of the RED solution.

Furthermore, in order to enhance the reversibility in depositing silver from or dissolving silver in electrolytic solution, an additive, e.g. ascorbic acid, is preferably added to the solution. The ascorbic acid is added preferably with a fraction of 5 to 200 mmol/L.

Silver salt used as a RED material has capability of shielding the light almost uniformly in the visible region, but it sometimes causes the solution system to become turbid with difficulty in keeping the transparency of the solution. This is due to by-products produced when the silver is dissolved into the solution from deposition electrodes in being deposited from or dissolved in the silver (complex) salt.

Results of investigation revealed that, in a solution including silver (complex) salt used as an RED material, iodine developed in dissolving deposited silver sometimes made the solution turbid. Therefore, addition of a reducing agent which reduces the deposited iodine into the ionized state can prevent the solution from becoming turbid in yellow.

Consequently, a solution is preferably used as an RED solution with silver halide being dissolved and with a reducing agent being added.

Especially, in a system in which silver iodide is used with further sodium iodide being added, ascorbic acid and/or tin chloride is preferably used as a reducing agent for suppressing deposition of iodine produced when the deposited silver is dissolved, for preventing a reduction in the transmissivity of the RED solution and for suppressing changes of bath composition caused by in situ formed on developed iodine. In this case, the reducing agent is added preferably within a range from equal to to double the concentration of the silver halide.

It is preferable that the solution does not absorb light in the visible region when in its colorless state and that the ITO electrodes that absorb less light in the visible region with almost uniform absorption is used so that the substrate electrodes for making the solution colored or colorless are made to function as an optical filter.

When colored and colorless states are repeated by using an RED solution, the device is too small to stir the solution system. Thus, the device is driven preferably by controlling an electric current that facilitates quantification of the deposition and dissolution reaction of the silver.

As a method of driving the solution to be colored and colorless by such a current control, a driving method with a current that makes rectangular changes from high current value to low current value is preferable to improve the speed of becoming colored and colorless (deposition and dissolution speed of silver). A driving method with a current that makes rectangular changes from low current value to high current value is also preferable to reduce damages to substrate caused by repetitive deposition and dissolution of silver.

In the following, embodiments of the present invention will be explained.

Figure 2:
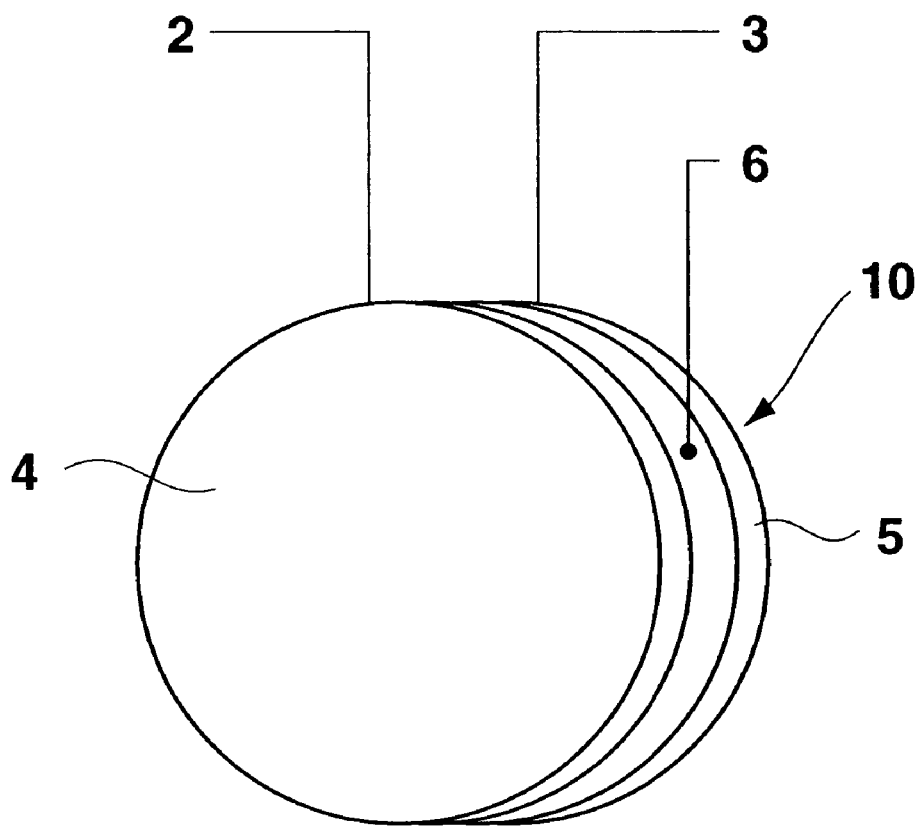
FIG. 2 is a conceptual illustration of the optical filter shown in FIG. 1.

FIG. 1 and FIG. 2 are schematic views showing an embodiment of an optical filter 10 according to the present invention.

In the optical filter 10, a pair of transparent substrates 4 and 5 (e.g. glass plates) forming a cell are arranged in parallel at a fixed interval and each transparent substrate functions as a display window. On the inside surfaces of those substrates, there are provided transparent working electrodes 2 and 3 (e.g. ITO electrodes), respectively, so that they are facing each other. At least either of those working electrodes 2 and 3 is used as an electrode for coloring or for making colorless.

A counter electrode 6 is provided on the whole circumferences of all round the substrates 4 and 5 with the counter electrode 6 also serving as a spacer. The counter electrode comprises, for example, a silver plate. Although not illustrated, the optical filter 10 is provided with a reference electrode which is, for example, a silver wire.

Between transparent electrodes 2 and 3 facing each other is encapsulated an RED solution 1 so as to be in con tact with those electrodes 2 and 3 and the reference electrode. The RED solution contains silver (complex) salt used as an electrochromic material. A DC driving voltage is applied across the counter electrode and the transparent electrodes 2 and 3 for a specified time to make the silver (complex) salt to induce a redox reaction on the ITO electrodes as the cathodes as shown in the following expression, so that the display window becomes colored due to the Ag deposits on the transparent electrodes.

[Chemical Formula 2]

$$Ag^+ + e^- \leftrightarrows Ag$$

By thus depositing Ag on an electrode, a specified color due to the Ag deposition can be observed from the display window, so that the solution functions as a filtering material. Then, the filtering function of the solution due to such coloring, that is, the visible light transmissivity (or color density) of the solution changes according to the magnitude of the voltage or its application time. Thus, by controlling this voltage or its application time, the optical filter 10 can be functioned as a filter with variable transmissivity. With the colored solution, the reflectance of the visible light can also be changed, so that the solution can also be functioned as a filter with variable reflectance.

This optical filter 10 may provide the electrodes 2 and 3 that are made to be formed almost all over the surface in the cell. Actually, however, it can be formed as exemplified in FIG. 3 and FIG. 4.

The transparent electrodes provided on the transparent substrates 4 and 5 are divided into center electrodes 2a and 3a, as well as ring-like electrodes 2b, 2c, 2d, 2e, and 3b, 3c, 3d and 3e arranged around the center electrodes 2a and 3a in a concentric configuration at fine intervals, respectively. Around the facing electrodes 2e and 3e at the outermost periphery are provided silver counter electrodes 6A and 6B used for potential compensation.

Those electrodes 2a and 3a, 2b and 3b, 2c and 3c, 2d and 3d, 2e and 3e, and 6A and 6B are connected to the driving power supplies 8A, 8B, 8C, 8D, 8E, and 8F with wirings 9A, 9B, 9C, 9E, and 9F of thin chrome wires, respectively.

The transparent substrates 4 and 5 are disposed a specified distance apart by a spacer 7 (In FIG. 1, the counter electrode 6 serves as this.), with the RED solution 1 encapsulated therebetween.

The RED solution 1, the redox reaction (that is, density) thereof being controlled depending on the applied voltage, can be made to change the amounts of silver deposition from the RED solution on the cathodes of the divided electrodes according to the voltages (V1, V2, V3, V4, and V5) applied to the divided electrodes 2a and 3a, 2b and 3b, 2c and 3c, 2d and 3d, 2e and 3e, respectively. Furthermore, a potential compensating voltage V6 is applied to the electrodes 6A and 6B.

Consequently, if all the applied voltage is made to be equal (V1=V2=V3=V4=V5), all portions of the RED solution 1 can be colored in uniform, and the color density can be changed uniformly according to the voltage.

If different voltage is applied to each electrode as, for example, V1<V2<V3<V4<V5, the color becomes denser from center to periphery (in other words, the transmissivity decreases as the position is changed from center to periphery). This is advantageous in using the optical filter 10 as an optical iris for a CCD (Charge Coupled Device) of a TV camera and this will be able to comply with the increase in CCD integration. If the voltages are applied in the reverse order, the transmissivity will be increased as the position is changed from center to periphery.

Thus, with the voltage applied to the divided electrodes, the density or gradation can be controlled with various patterns of the applied voltages, so that the optical filter becomes useful to be used in various fields of application.

As explained above, according to this embodiment, an RED material comprising silver salt is used as a filtering material for adjusting the amount of light of the optical device and the density of the colored RED material can be changed by controlling driving of transparent electrodes and counter electrode (especially, applied voltage) on the basis of a conception completely different from that of using the conventional RED material. By making good use of this characteristics, the color of the optical filter can be gradated. Consequently, use of the RED material can provide a minute and less electric power consuming filter which has more capability than the mechanically operated conventional variable ND filter as a light amount adjusting device.

The embodiment will be explained more in detail with reference to specific examples for which an optical filter is used with a configuration as shown in FIG. 1 and FIG. 2.

EXAMPLE 1

(Driving test for an element using silver halide AgX)

In this example, reversible deposition and dissolution of silver was studied by using silver halide. As the silver halide, silver iodide (AgEr) was used which has a higher reversibility than other silver (complex) salts.

Changes in transmissivity at a constant potential was examined to find a deposition potential for silver. A mixed solvent comprising dimethylsulfoxide (DMSO) and acetonitrile (AN) with a mixing ratio of DMSO: AN=1:1 was used as a solvent. The concentration of silver bromide was taken as 500 mmol/L. To dissolve the silver bromide and to increase the conductivity, sodium iodide (NaI) was dissolved in the solution by 750 mmol/L, then ascorbic acid was added to the solution by 50 mmol/L. This solution, an electrolytic solution, was used as an RED solution.

Change in a transmissivity was traced with time with the applied voltage to the cell being kept constant. That is, a constant potential driving method was used for driving the optical filter and silver was deposited for 2 sec. at −0.8V (cell voltage) and dissolved for 2 sec. at +1.0V (cell voltage). Here, ITO electrodes were used as working electrodes, a silver wire was used as a reference electrode and a silver plate as a counter electrode.

Figure 5:
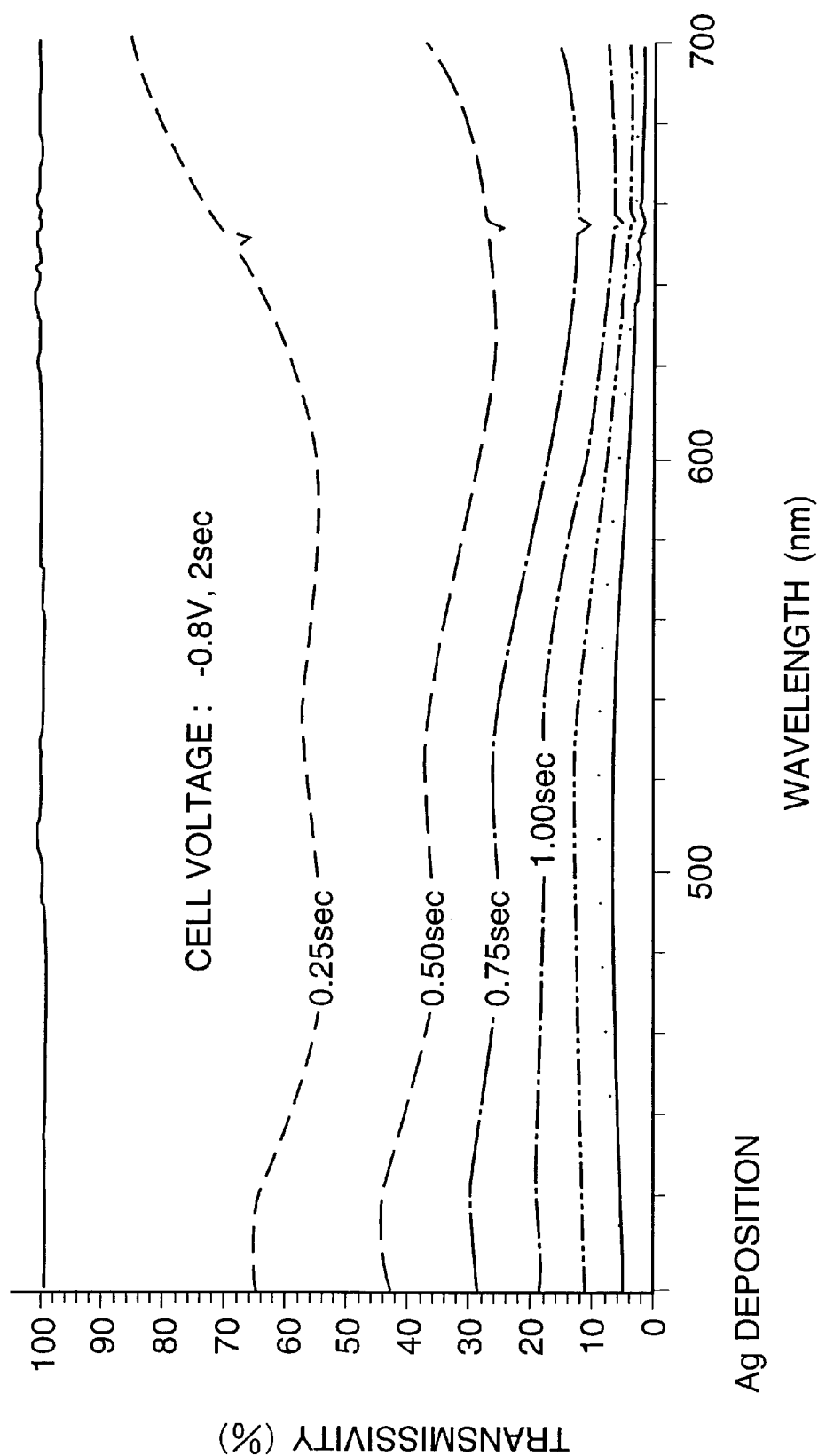
FIG. 5 is a spectrum diagram showing change in transmissivity when the example 1 of the optical filter according to the present invention is brought to be colorless.
Figure 6:
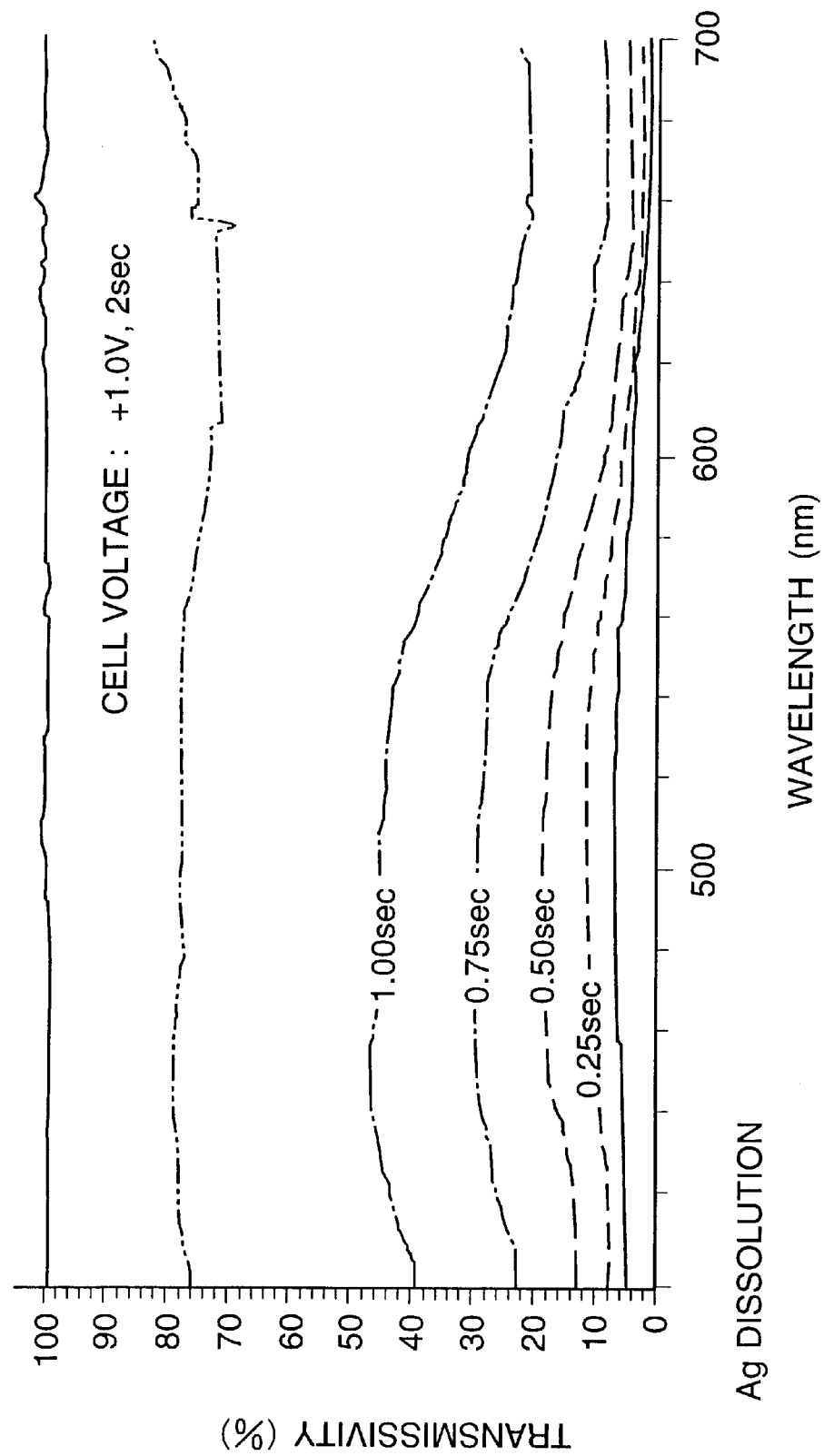
FIG. 6 is a spectrum diagram showing change in transmissivity when the example 1 of the optical filter according to the present invention is colored.

The results are shown in FIG. 5 and FIG. 6. It is found that Ag deposition on the cathode progresses with the time of voltage application to reduce the transmissivity and the shielding becomes satisfactory over the whole visible light region (400 to 700 nm in wavelength). Upon reversing the voltage polarity, the transmissivity increased due to dissolution of deposited silver. From such a change in transmissivity, it is shown that deposition and dissolution of silver are satisfactorily reversible.

EXAMPLE 2

(Keeping at low temperature test)

In Example 1, electrolytes were prepared by using various mixed solvents with a mixing ratio of DMSO: another solvent=1:1, and the property of each electrolytic solution in being kept at low temperature was examined by comparison with others. The results are shown in Table 1 with ○ denoting "Free from freezing" and × denoting "Solidified" or "Salt (NAI) deposited".

TABLE 1

| | Condition of Being Kept at Low Temperature | |
|---|---|---|
| Another solvent mixed in DMSO | −10° C., 2 hours | −20° C., 2 hours |
| AN | ○ | ○ |
| γ-BL | ○ | ○ |
| DMAC | ○ | x-○ |
| NMP | ○ | x-○ |

TABLE 1-continued

|  | Condition of Being Kept at Low Temperature | |
|---|---|---|
| Another solvent mixed in DMSO | −10° C., 2 hours | −20° C., 2 hours |
| PC | o | x-o |
| DOL | o | o |

AN: acetonitrile, γ-BL: γ-butyrolactone, DMAC: dimethylacetamide, and NMP: n-methylpyrolidone, PC: propylene carbonate, DOL: dioxolane.

From the result it is understood that when a mixed solvent is used in which another solvent is mixed with DMSO, the electrolytic solution is not frozen so easily at low temperature that the low temperature property is improved. When DMSO is used only, the electrolytic solution was frozen on any of the above conditions of being kept at low temperature.

EXAMPLE 3

(Selection of suitable mixed solvents)

Figure 7:
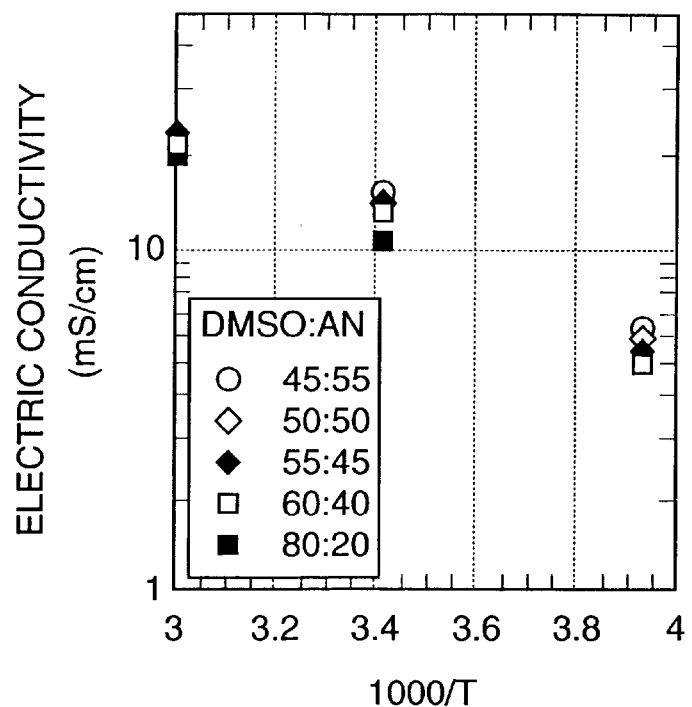
FIG. 7 is a graph showing temperature dependence of the electric conductivities of the electrolytic solutions for various mixing ratios of the mixed solvent used in other examples of the optical filter according to the present invention.

An optimization study was carried out on the RED solution, an electrolytic solution, of Example 1 for determining the mixing ratio of the mixed solvent used and the concentration of the solute. Electrolytes including AgBr of 500 mmol/L and NaI of 750 mmol/L were prepared with various mixing ratios of DMSO:AN. Electric conductivities of the electrolytic solutions, which were kept for two hours at −20° C. (1000/T≈3.95), room temperature (1000/T≈3.41), and 60° C. (1000/T≈3.95), were measured by setting them between a pair of electrodes which were driven with high frequencies of 1 k to 100 kMHz. The results are shown in FIG. 7 as temperature dependence of the electric conductivities of the electrolytic solutions for various mixing ratios (volume ratios) of the mixed solvent.

In addition, electrolytic solutions with various mixing ratio of DMSO: AN were examined about property after being kept for two hours at −20° C. and easiness in handling the electrolytic solution at a room temperature (insusceptibility of changing the mixing ratio at filling the cell with the solvent in mixed state). The results are shown in Table 2 below. Here, "Salt deposited" in the column "Kept at −20° C.", means deposition of NaI and, in the column "Easiness in Handling at Room Temperature", ⊚ denotes "Excellent", o "Good", Δ "Acceptable" and × "Unacceptable".

TABLE 2

| DMSO/AN (vol. Ratio) | Kept at −20° C. | Easiness in Handling at Room Temperature |
|---|---|---|
| 45:55 | Salt deposited in certain cases | X |
| 50:50 | Free from freezing | Δ |
| 55:45 | Free from freezing | ⊚ |
| 60:40 | Partly solidified in certain cases | o |
| 80:20 | Solidified in certain cases | o |

From the above results, it is found that the electric conductivity is liable to decrease at lower temperatures and low temperature properties are liable to be deteriorated with an increase in DMSO ratio due to solidification or reduction in electric conductivity. However, it is also observed that sufficient DMSO concentration is necessary for well dissolving the supporting electrolyte. It is also found that excessively low DMSO concentration is liable to induce deposition of salt (NaI: the same applies hereinafter) in the electrolytic solution being kept at lower temperature. Consequently, from the both stand points of low temperature property and solubility, the DMSO concentration can be found to be better determined as DMSO:AN=(50:50) to (55:45) with the optimum of DMSO:AN=(55:45).

Figure 8:
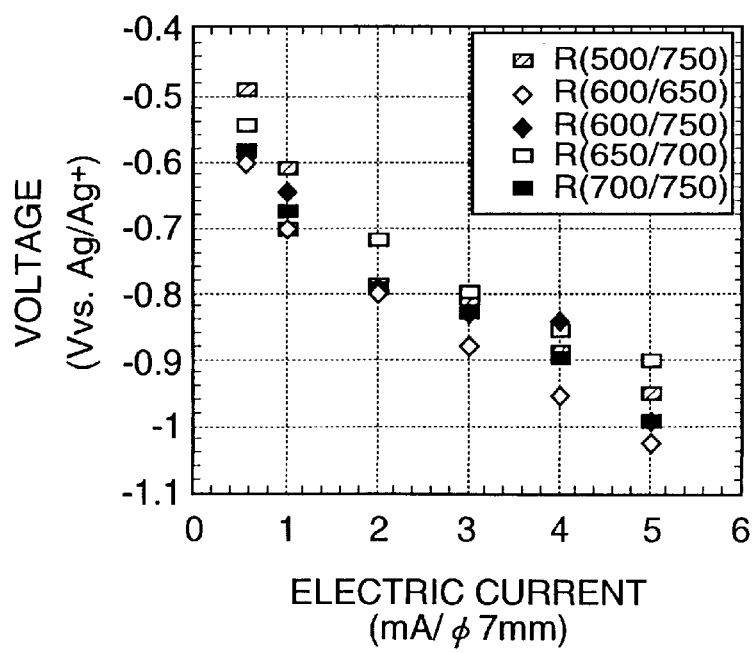
FIG. 8 is a graph showing voltage to current characteristics of the electrolytic solution for various concentration ratio(mmol/mmol) of the silver salt to the supporting electrolyte in other examples of the optical filter according to the present invention.

Next to this, polarization of the electrolytic solution was examined for various concentrations of the silver salts and the supporting electrolytes with the ratio of DMSO:AN being fixed at DMSO:AN=(55:45). A voltage across the working electrode and the reference electrode was measured when silver was deposited at the 7 mm diameter working electrode with a constant electric current and the polarization was compared by taking the measured voltage as corresponding to the polarization. FIG. 8 shows the results as voltage to current characteristics of the electrolyte for various concentration ratios (mmol/mmol) of the silver salt to the supporting electrolyte.

The results show that the smallest polarization is obtained with AgBr of 650 mmol/L and NaI of 700 mmol/L which are apparently the optimum. However, it was found that they brought poor reversibility and the concentrations providing the second smallest polarization with AgBr of 500 mmol/L and NaI of 750 mmol/L were found to be practically the optimum ones.

EXAMPLE 4

(Solubility of the solutes)

Solubility of the solutes were examined about various combinations of kinds of silver salts and kinds of supporting electrolytes with the mixing ratio of DMSO to another solvent fixed at 50:50 and with the ratio of silver salt to the supporting electrolyte fixed at 500 mmol/L:750 mmol/L as described for the Example 3. The results obtained at room temperature are shown in Table 3, Table 4 and Table 5 below, where ⊚ denotes "Easily soluble", o "Soluble", Δ "Hardly soluble", × "Insoluble" and −"No measured data".

TABLE 3

| AN | NaI | NaBr | LiI | LiBr |
|---|---|---|---|---|
| AgI | — | ⊚ | — | ⊚ |
| AgBr | ⊚ | — | o | — |

TABLE 4

| PC | NaI | NaBr | LiI | LiBr |
|---|---|---|---|---|
| AgI | — | X | — | o |
| AgBr | Δ | — | ⊚ | — |

TABLE 5

| DOL | NaI | NaBr | LiI | LiBr |
|---|---|---|---|---|
| AgI | — | X | — | ⊚ |
| AgBr | Δ | — | o | — |

Table 3 shows that AgI is well combined with NaBr or LiBr, and AgBr is well combined with NaI or LiI in the mixed solvent of DMSO and AN. Similarly, Table 4 shows that AgI is well combined with LiBr and AgBr is well combined with LiI in the mixed solvent of DMSO and PC, and Table 5 shows that AgI is well combined with LiBr and AgBr is well combined with LiI in the mixed solvent of DMSO and DOL.

EXAMPLE 5

(Selection of other suitable mixed solvents)

The RED solution, an electrolytic solution, of Example 1 was examined about property after being kept for two hours at −20° C. with various mixing ratios(volume ratios) of various kinds of another solvent to be mixed with DMSO. The results are shown in Table 6 to Table 11, where − denotes "No measured data", and PC propylenecarbonate, DME 1,2-dimethoxyethane, DEE 1,2-diethoxyethane, DMF N,N-dimethylformamide, DOL 1,3-dioxolane, and DMAC N,N-dimethylacetamide. In addition, the cases represented by "Solidified" and "Salt Deposited" in Tables include some cases in which the electrolyte may be solidified in addition to the case in which the electrolyte is entirely solidified, and some cases in which the salt may be deposited in addition to the case in which the salt is entirely deposited, respectively.

TABLE 6

| DMSO/PC (vol. ratio) | Kept at −20° C. |
|---|---|
| 50:50 | Salt deposited |
| 55:45 | Partly deposited |
| 60:40 | Free from freezing |
| 70:30 | Solidified |

TABLE 7

| DMSO/DME (vol. ratio) | Kept at −20° C. |
|---|---|
| 50:50 | Salt deposited |
| 55:45 | Partly deposited |
| 60:40 | Salt deposited |
| 70:30 | Salt deposited |

TABLE 8

| DMSO/DEE (vol. ratio) | Kept at −20° C. |
|---|---|
| 50:50 | Salt deposited |
| 55:45 | Salt deposited |
| 60:40 | Salt deposited |
| 70:30 | Salt deposited |

TABLE 9

| DMSO/DMF (vol. ratio) | Kept at −20° C. |
|---|---|
| 50:50 | — |
| 55:45 | — |
| 60:40 | — |
| 70:30 | Solidified |

TABLE 10

| DMSO/DOL (vol. ratio) | Kept at −20° C. |
|---|---|
| 50:50 | Salt deposited |
| 55:45 | Free from freezing |
| 60:40 | Free from freezing |
| 70:30 | Solidified |

TABLE 11

| DMSO/DMAC (vol. ratio) | Kept at −20° C. |
|---|---|
| 50:50 | Salt deposited |
| 55:45 | — |
| 60:40 | Partly solidified |
| 70:30 | Solidified |

The above results, together with those in Table 2, show that it is desirable for a mixed solvent comprising dimethylsulfoxide and another solvent to include larger fraction of dimethylsulfoxide than that of another solvent in making solubilities and low temperature properties of the silver salt and the supporting salt compatible.

In this case, the mixed solvent preferably comprises a plurality of kinds of solvents having structures different from each other. For example, it preferably comprises a solvent with a chain structure (DMSO in the above) and a solvent with a cyclic structure (PC or DOL in the above). The mixed solvent of DMSO and AN can be said as comprising solvents with structures different from each other, since the former has a chain structure with two hydrocarbon groups (methyl-groups) being bonded via a sulfur atom (hetero-atom), while the latter can not be said to have a chain structure because of comprising only one hydrocarbon group (methyl-group).

The mixing ratio of the solvents is, in the mixed solvent comprising dimethylsulfoxide and acetonitrile, preferably (dimethylsulfoxide:acetonitrile)=(50:50) to (55:45) in volume ratio, and in the mixed solvent comprising dymethylsulfoxide and a solvent with a cyclic structure, preferably (dimethylsulfoxide:solvent with a cyclic structure)=(55:45) to (60:40). Excessively small fraction of dimethylsulfoxide will be liable to cause salt deposition. Conversely, excessively large fraction will be liable to cause solidification at low temperature. The salt deposition is considered to be due to NaI deposition. In electrolytic solutions with the salt being deposited, some were free from freezing and some were solidified.

EXAMPLE 6

(suitable mixed solvents based on solute concentration)

The RED solution, an electrolytic solution, of Example 1 was examined about property after being kept for twelve hours at −30° C. with various mixing ratios(volume ratios) of various kinds of another solvent to be mixed with DMSO. The results are shown in from Table 12 to Table 16, where − denotes "No data measured".

TABLE 12

| DMSO:AN | 50:50 | 40:60 | 30:70 | 20:80 | 10:90 |
|---|---|---|---|---|---|
| AgBr (mmol/L) | 453 | 363 | 273 | 180 | 90 |
| NaI (mmol/L) | 680 | 545 | 410 | 270 | 136 |
| −30° C., 12 Hr | Free from freezing | Free from freezing | Free from freezing | Free from freezing | — |

TABLE 13

| DMSO:PC | 50:50 | 40:60 | 30:70 | 20:80 | 10:90 |
|---|---|---|---|---|---|
| AgBr (mmol/L) | 453 | 363 | 273 | 180 | 90 |
| NaI (mmol/L) | 680 | 545 | 410 | 270 | 136 |
| −30° C., 12 Hr | Free from freezing | Free from freezing | Free from freezing | Free from freezing | — |

TABLE 14

| DMSO:AN | 50:50 | 40:60 | 30:70 | 20:80 | 10:90 |
|---|---|---|---|---|---|
| AgI (mmol/L) | 453 | 363 | 273 | 180 | 90 |
| LiBr (mmol/L) | 680 | 545 | 410 | 270 | 136 |
| −30° C., 12 Hr | Free from freezing | Free from freezing | Free from freezing | Free from freezing | — |

TABLE 15

| DMSO:PC | 50:50 | 40:60 | 30:70 | 20:80 | 10:90 |
|---|---|---|---|---|---|
| AgI (mmol/L) | 453 | 363 | 273 | 180 | 90 |
| LiBr (mmol/L) | 680 | 545 | 410 | 270 | 136 |
| −30° C., 12 Hr | Solidified | Free from freezing | Free from freezing | Free from freezing | — |

TABLE 16

| DMSO:DOL | 50:50 | 40:60 | 30:70 | 20:80 | 10:90 |
|---|---|---|---|---|---|
| AgI (mmol/L) | 453 | 363 | 273 | 180 | 90 |
| LiBr (mmol/L) | 680 | 545 | 410 | 270 | 136 |
| −30° C., 12 Hr | Free from freezing | Free from freezing | Free from freezing | Free from freezing | — |

The above results show that the above mixed solvents preferably comprise DMSO and another solvent. The mixing ratio for making the mixed solvent provide good low temperature property, however, is changed depending on the total concentration of the solute comprising the silver salt and the supporting electrolyte. Particularly, as the total solute concentration is reduced by decreasing amount of the supporting electrolyte together with decrease in amount of the silver salt, the mixed solvent can be kept free from freezing at low temperature even when the fraction of DMSO is reduced to be smaller than the above mentioned one with the range of the mixing ratio to another solvent being expanded from 50:50 to 20:80.

Although embodiments according to the present invention are explained as above, the embodiments may be modified on the basis of the technical concept of the invention.

For example, the RED material mentioned above, particularly, type of solvent, combination of RED solution components, and concentration may be variously changed and the silver salt may also be not limited to those which are shown in the above examples.

Figure 3:
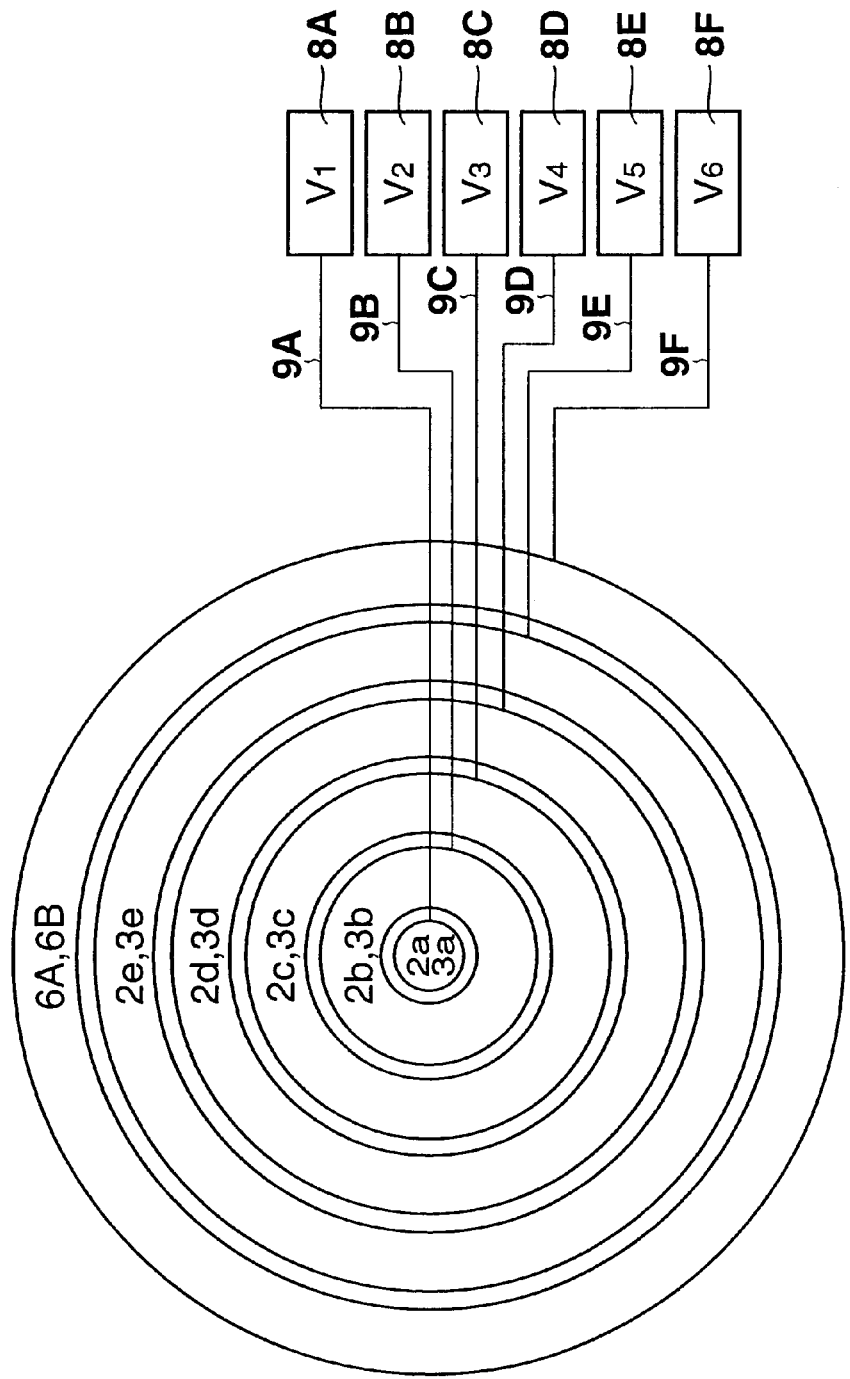
FIG. 3 is a schematic illustration showing a specific example of a pattern of ITO electrodes arrangement in the optical filter shown in FIG. 1.
Figure 4:
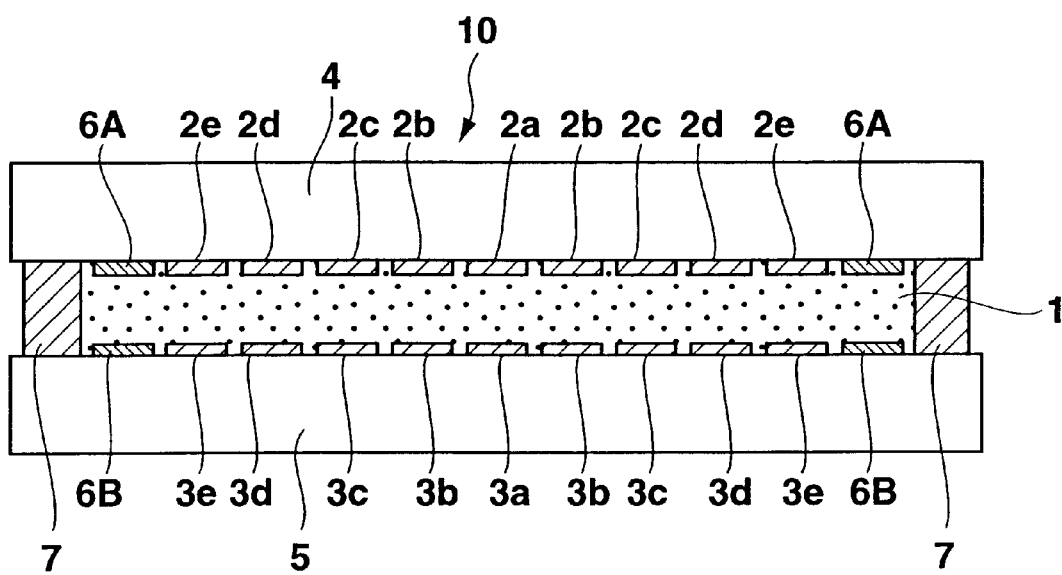
FIG. 4 is a schematic cross sectional view of the embodiment of the optical filter with the pattern of ITO electrodes arrangement shown in FIG. 3.

The structure of the optical filter including ITO electrode patterns, as well as component materials, and furthermore, the driving method may be not limited to those explained above. For example, as for the filter structure, the electrode pattern as shown in FIG. 3 may be changed from a concentric rings or bullseye-type to a stripe-type or a lattice-type pattern. In addition, the cell may be divided into those containing mutually different RED solutions to be arranged in parallel with each other at the respective divided electrode.

The optical filter mentioned above may also be combined with another well-known filter material (e.g. organic electrochromic material, liquid crystal, electro-luminescence material). This optical filter can be widely used for adjusting light volume in, including the use for CCD optical irises, various optical systems, furthermore, in electrophotographic copying machines and optical communication devices.

As explained above, in the present invention, an RED solution containing silver salt is used as a filter material for adjusting an amount of light for an optical device to form a reversible system for depositing and dissolving silver due to silver salt on transparent electrodes by controlling driving of facing electrodes on the basis of a conception completely different from that of using the conventional RED materials. Thus, this invention can provide a less power consuming and non-light-emitting optical device suitable for the visible light region by using the RED material.

The solvent used for preparing the silver salt solution is a mixed solvent comprising at least two kinds of solvents, and dimethylsulfoxide (DMSO) is particularly combined with a solvent having good affinity with DMSO so that both are used as a mixed solvent, by which the low temperature characteristic of the element can be improved to expand the service temperature range. Consequently, a problem due to poor temperature characteristic of the element in using single solvent, which limits working environment of the element, can be eliminated. Thus, in the optical device and the electrolytic solution according to the present invention, by using solvents, which are high in reversibility, but poor in temperature property, in a form of a mixed solvent, the electrolytic solution can be prevented from freezing even when the optical device is used in cold districts.

What is claimed is:

1. An optical device comprising:
   a pair of substrates disposed in parallel, aligned and opposing spaced apart relationship, at least one of said substrates being transparent;
   at least one transparent electrode disposed on an inwardly facing side of the transparent substrate;
   at least one counter electrode;
   a peripheral spacer provided between said pair of substrates along peripheral portions thereof;
   an electrolytic solution provided in a space between said pair of substrates and bounded by said peripheral spacer, said electrolytic solution comprising: a mixed solvent comprising dimethylsulfoxide as a first solvent and at least one second solvent selected from the group consisting of acetonitrile, propylene carbonate and dioxolane; a silver halide salt having a first halide anion and a supporting salt selected from alkali metal halide salts or alkaline earth metal salts, said supporting salt having a second halide anion different from said first halide anion, said electrolytic solution being liquid at low temperatures and remaining free from freezing even after being maintained at temperatures about −30° C. for a period of about 12 hours; and
   a driver applying a variable voltage to said at least one transparent electrode and said counter electrode, such that said silver salt is deposited or dissolved in response to said applied voltage, thereby causing the electrolytic solution to be colored or to be colorless, respectively.

2. An optical device as defined in claim 1, wherein said mixed solvent is a mixture of said dimethylsulfoxide and said second solvent at a volume ratio of dimethylsulfoxide: second solvent of from about (60:40) to about (20:80).

3. An optical device as defined in claim 1, wherein said dimethylsulfoxide has a volume fraction equal to or more than that of said second solvent.

4. An optical device as defined in claim 1, wherein said mixed solvent is a mixture of dimethylsulfoxide and acetonitrile as said second solvent at a volume ratio of dimethylsulfoxide:acetonitrile of from about 50:50 to about (55:45).

5. An optical device as defined in claim 1 wherein said mixed solvent is a mixture of dimethylsulfoxide and propylene carbonate as said second solvent at a volume ratio of (dimethylsulfoxide:propylene carbonate) of from about (55:45) to about (60:40).

6. An optical device as defined in claim 1, wherein said silver halide is present in said electrolytic solution at a molar concentration in the range of 0.005 to 2.0 mol/L.

7. An optical device as defined in claim 1, wherein said supporting salt is present in said electrolytic solution at a concentration in the range of ½ to 5 times the concentration of said silver salt.

8. An optical device as defined in claim 1, wherein said transparent electrode is chemically or physically modified so as to act as a working electrode for depositing or dissolving silver as an optical filtering material.

9. An optical device as defined in claim 1, wherein said electrolytic solution further comprises ascorbic acid.

10. An optical device as defined in claim 9, wherein said ascorbic acid has been dissolved with a molar concentration in the range of 5 to 200 mmol/L.

11. An optical device as defined in claim 8, wherein said transparent electrode is an ITO electrode physically modified such that it has a layer of evaporation deposited metal thereon comprising a metal nobler than silver.

12. An optical device as defined in claim 8, wherein said transparent electrode is an ITO electrode chemically modified by a palladium surface activation treatment.

13. An optical device as defined in claim 1, wherein said electrolytic solution comprises a mixture of dimethylsulfoxide (DMSO) and acetonitrile (AN) at a volume ratio of DMSO:AN of from about 50:50 to about 55:45, respectively, and said silver halide salt is silver iodide or silver bromide and when the silver halide salt is silver iodide the supporting salt is sodium bromide or lithium bromide and when the silver halide salt is silver bromide the supporting salt is sodium iodide or lithium iodide.

14. An optical device as defined in claim 1, wherein said electrolytic solution comprises a mixture of dimethylsulfoxide (DMSO) and dioxolane (DOL) at a volume ratio of DMSO:DOL of from about 55:45 to about 60:40, respectively, and said silver halide salt is silver iodide or silver bromide and when the silver halide salt is silver iodide the supporting salt is lithium bromide and when the silver halide salt is silver bromide the supporting salt is lithium iodide.

15. An optical device as defined in claim 1, wherein said electrolytic solution comprises a mixture of dimethylsulfoxide (DMSO) and propylene carbonate (PC) at a volume ratio of DMSO:PC of about 60:40 and the silver halide salt is silver iodide or silver bromide and when the silver halide salt is silver iodide the supporting salt is lithium bromide and when the silver halide salt is silver bromide the supporting salt is lithium iodide.

16. An electrolytic solution comprising:
a mixed solvent comprising dimethylsulfoxide as a first solvent and at least one second solvent selected from the group consisting of acetonitrile, propylene carbonate and dioxolane;
a silver halide salt having a first halide anion; and
a supporting salt selected from alkali metal halide salts or alkaline earth metal salts, said supporting salt having a second halide anion different from said first halide anion, said electrolytic solution being liquid at low temperatures and remaining free from freezing even after being maintained at temperatures of about −30° C. for a period of about 12 hours.

17. An electrolytic solution as defined in claim 16 wherein said mixed solvent is a mixture of dimethylsulfoxide and said second solvent at a volume ratio of dimethylsulfoxide:second solvent of from about (60:40) to about (20:80).

18. An electrolytic solution as defined in claim 16, wherein said dimethylsulfoxide has a volume fraction equal to or more than that of said second solvent.

19. An electrolytic solution as defined in claim 16, wherein said mixed solvent is a mixture of dimethylsulfoxide and acetonitrile at a volume ratio of dimethylsulfoxide:acetonitrile of from about (50:50) to about (55:45).

20. An electrolytic solution as defined in claim 16, wherein said mixed solvent is a mixture of dimethylsulfoxide and propylene carbonate as said second solvent at a volume ratio of dimethylsulfoxide:propylene carbonate of from about 55:45 to about 60:40.

21. An electrolytic solution as defined in claim 16, wherein said silver halide is present in said electrolytic solution at a molar concentration in the range of 0.005 to 2.0 mol/L.

22. An electrolytic solution as defined in claim 16, wherein said supporting salt is present in said electrolytic solution with a concentration in the range of ½ to 5 times the concentration of said silver salt.

23. An electrolytic solution as defined in claim 16, wherein said electrolytic solution further comprises ascorbic acid.

24. An electrolytic solution as defined in claim 23, wherein said ascorbic acid has been dissolved with a molar concentration in the range of 5 to 200 mmol/L.

25. An electrolytic solution as defined in claim 16, wherein said electrolytic solution comprises a mixture of dimethylsulfoxide (DMSO) and acetonitrile (AN) at a volume ratio of DMSO:AN of from about 50:50 to about 55:45, respectively, and said silver halide salt is silver iodide or silver bromide and when the silver halide salt is silver iodide the supporting salt is sodium bromide or lithium bromide and when the silver halide salt is silver bromide the supporting salt is sodium iodide or lithium iodide.

26. An electrolytic solution as defined in claim 16, wherein said electrolytic solution comprises a mixture of dimethylsulfoxide (DMSO) and dioxolane (DOL) at a volume ratio of DMSO:DOL of from about 55:45 to about 60:40, respectively, and said silver halide salt is silver iodide or silver bromide and when the silver halide salt is silver iodide the supporting salt is lithium bromide and when the silver halide salt is silver bromide the supporting salt is lithium iodide.

27. An electrolytic solution as defined in claim 16, wherein said electrolytic solution comprises a mixture of dimethylsulfoxide (DMSO) and propylene carbonate (PC) at a volume ratio of DMSO:PC of about 60:40 and the silver halide salt is silver iodide or silver bromide and when the silver halide salt is silver iodide the supporting salt is lithium bromide and when the silver halide salt is silver bromide the supporting salt is lithium iodide.

* * * * *